Dec. 3, 1957 W. M. LEWIS, JR., ET AL 2,815,474

GLASS SEALED SEMICONDUCTOR RECTIFIER

Filed Jan. 25, 1957

WILLIAM M. LEWIS, JR.,
HENRY D. FRAZIER,
INVENTORS.

By Spensley & Horn
ATTORNEYS.

United States Patent Office 2,815,474

Patented Dec. 3, 1957

2,815,474

GLASS SEALED SEMICONDUCTOR RECTIFIER

William M. Lewis, Jr., Monterey Park, and Henry D. Frazier, Los Angeles, Calif., assignors to Pacific Semiconductors, Inc., Culver City, Calif., a corporation of Delaware Application January 25, 1957, Serial No. 636,279

9 Claims. (Cl. 317—236)

This invention relates to semiconductor devices and more particularly to a new and improved package assembly for semiconductor crystal diodes.

It has long been recognized in the semiconductor art that a hermetically sealed package, wherein the semiconductor crystal is mounted within a miniaturized cylindrical housing, the central region of which is composed of a glass tube, affords a foundation for designing the ideal package.

Many coaxial diode packages incorporating such a design may be found in the prior art. Typically, these prior art packages comprise a central glass or ceramic tube which has metal sleeves sealed to the opposite ends thereof. These sleeves receive pins which are sealed to the sleeves, the pins carrying the semiconductor crystal and whisker or lead element connected thereto. One example of such a prior art package is disclosed in British Patent No. 616,065 entitled "Improvements in and Relating to Crystal Contact Devices," issued January 17, 1949.

The relatively large diameter of the pins as disclosed in the British patent and in other prior art packages permits of greater thermal conductivity, i. e. they act as a heat sink. Thus, the maximum current which a diode encased in such a package can tolerate is increased, this in contrast to the relatively small diameter wires used in other present art glass sealed semiconductor diode packages.

The tubes for receiving these pins are usually machined metal which have a thermal coefficient of expansion of the same order of magnitude as does glass; one such metal being Kovar. Another example of a semiconductor package using such a sleeve is disclosed and claimed in copending U. S. patent application Serial No. 497,353 entitled, "Glass Sealed Crystal Rectifier," by Justice N. Carmen, Jr., filed March 21, 1955, assigned to the assignee of the present invention.

Many disadvantages are attendant by the use of such machined tubes in the production of semiconductor diode packages. Among these disadvantages without special significance being attached to order of presentation are the following: The metals presently available for the machined tubes do not have a consistent machinability. Further, during the machining steps the metal has a tendency to work harden which results in poor tool life and therefore more expensive cost per unit. The severe tool wear results in relatively poor tolerances of tube dimensions. Further, due to the above factors, a tapering often results in the interval cross-section of the tube producing a strain when the hereinbefore mentioned pin is introduced into the tube. This strain may result in a fracture of the glass envelope or at least increase the likelihood of such a fracture during the hereinafter to be discussed drop or impact test. Still another disadvantage attendant with these machined tubes is the inherently poor surface finish of the tube which produces a typically unsatisfactoy hermetic seal and results in poor weldability to the pin. The welding operation is further complicated due to the variable wall thickness in the tubes due to machining. As a result the thinner wall areas may be overwelded while the thicker wall portions may be underwelded.

Further during the cut-off operation in machining these tubes, burrs which are produced often cause fracture of the glass envelope sealed to the tubes. In extreme cases of variable wall thickness tubes holes may be produced through the thinnest portion of the walls by the etching process.

All of the above difficulties encountered in producing machined tubes imply a high reject ratio resulting in high unit cost of units passing final inspection to say nothing of the high cost of inspection itself.

In an attempt to overcome these and other difficulties attendant with machined tubes such as the "drop test" problem hereinafter to be discussed, the first thought was to adapt plain straight tubing. This approach was rejected due to the fact that without a step or a register of some sort between the tube and the glass envelope portion, new difficulties were encountered. Firstly, the transverse positioning of the envelope relative to the tubes was complicated. Secondly, a "feathering" effect took place between the glass envelope and the tubes upon sealing of the two. By feathering is meant the gradual thinning out of the glass thickness along the length of the tube after it melts and runs along the outside of the tubes. This caused many fractures during handling and drop testing.

In the production of these and other prior art diodes, it is necessary to subject each completed packaged device to a shock or drop test to determine whether the device will remain mechanically and electrically intact after continued actual use. For example, in manufacturing semiconductor devices for military use it is required that in order to conform with Joint Army and Navy (JAN) specifications, the devices must be dropped a specified distance onto a specified surface and remain mechanically undamaged and electrically operative. The standard drop test specified by the Army and Navy calls for a drop from a height of 30 inches onto a maple block.

In the previously referred to British patent and in all of the other prior art diode packages using large pins as electrodes hereinbefore discussed, the losses incurred in the drop testing procedure is often considerable.

The present invention overcomes all of the above difficulties attendant in the manufacture of small semiconductor devices.

According to the basic concept of the present invention beaded tubes are provided to be sealed to the intermediate glass envelope. The bead or bellows region thereof acts as a register for the glass. These tubes are then, as in the prior art packaging method themselves, sealed by soldering or welding or other prior art methods to the subsequently inserted metal pins or electrodes.

Accordingly, it is an object of the present invention to provide an improved semiconductor glass sealed package.

A further object of the present invention is to provide a new and improved sleeve for large electrode semiconductor diode packages.

Still another object of the present invention is to provide a semiconductor crystal package of low cost and high reliability.

Yet another object of the present invention is to provide a semiconductor crystal package which has a marked ability to withstand mechanical shock and vibration.

The novel features which are believed to be characteristic of the present invention together with the other objects and advantages thereof, will be better understood from the following description considered in connection with the accompanying drawing.

In the drawing:

Figures 1*a* to 1*c* are partial cross sectional views of a beaded tube employed in the package of the present invention;

Figures 1A, 1B, 1C, 2, 3, 4, 5, 6A, 6C:
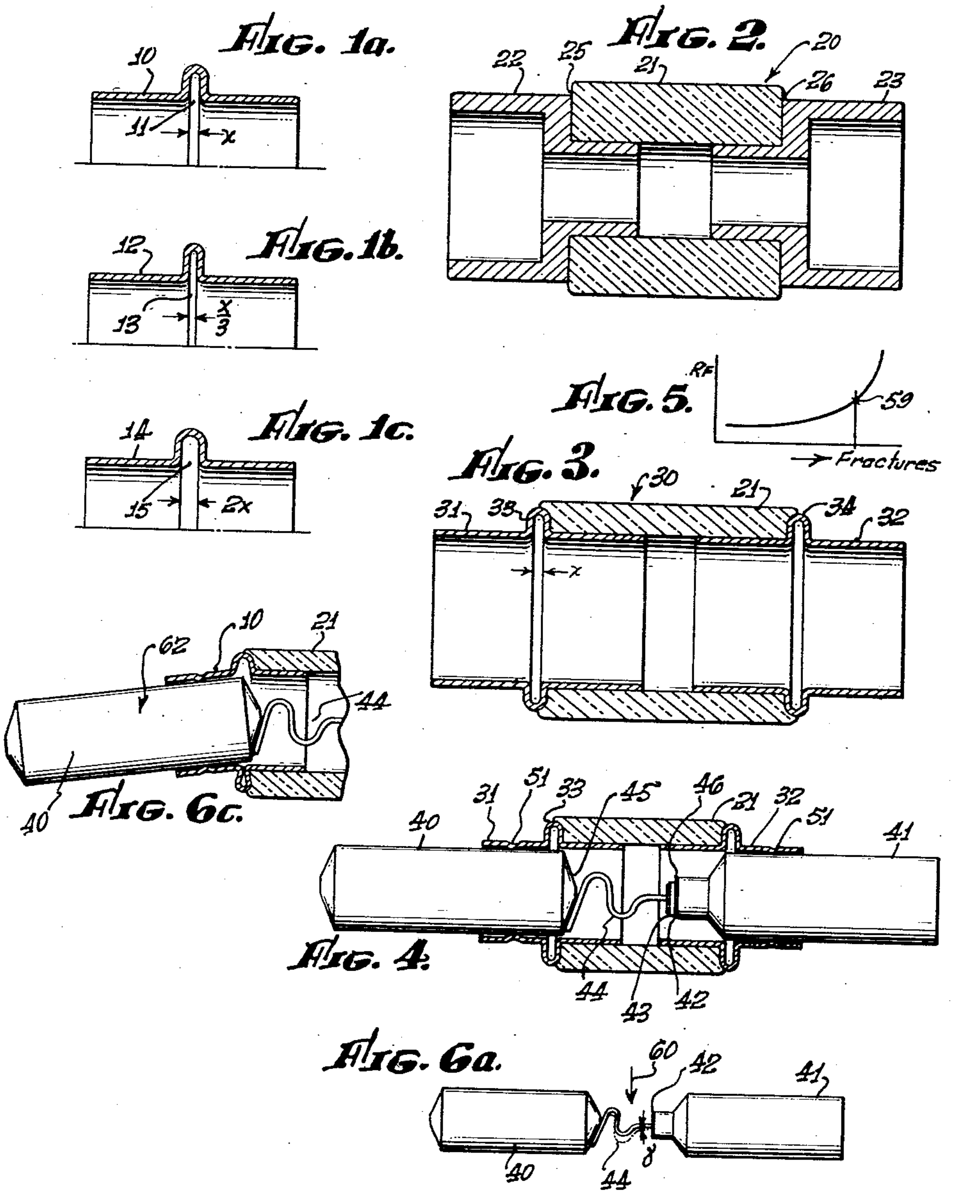
Figure 2 is a cross sectional view of a typical tube and glass envelope subassembly according to prior art packages.
Figure 3 is a cross sectional view of a beaded tube and glass envelope subassembly according to the present invention.
Figure 4 is a cross sectional view of a completed diode employing a beaded tube according to the present invention.
Figure 5 is a graph, showing fractures as a function of frequency of drop tested diodes constructed according to the present invention.
Figure 6B:
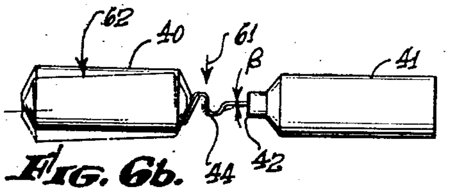

Figure 6*a* is a view showing the offset of the whisker after drop test of a typical diode housed in a subassembly constructed in accordance with that shown in Figure 2;

Figure 6*b* is a view showing the offset angle of the whisker at the instant of impact during drop test of a typical diode housed in a subassembly constructed in accordance with that shown in Figure 3; and Figure 6*c* is a partial cross sectional view showing the effect upon the beaded flange of the tube of the package shown in Figure 4 during a drop test.

Referring now to the drawings there are shown in Figures 1*a* through 1*c* partial sectional views of one half of the beaded tube which is employed in the semiconductor crystal diode package according to the present invention. In Figure 1*a* beaded tube 10 has an opening 11 in the bellows thereof of magnitude of X. Beaded tube 12 of Figure 1*b* has an opening in its bellows of the order X/3, while beaded tube 14 of Figure 1*c* has in opening 15 in its bellows of a value 2X. The significance of the varying dimensions in the openings in the bellows tubes 10, 12 and 14 will hereinafter be explained. The tubes 10, 12 and 14 are made of metal having substantially the same thermal coefficient of expansion as does glass, one example of such metal being Kovar.

In Figure 2 there is shown an envelope subassembly 20 consisting of annular insulator member 21 sealed at opposite ends thereof to machined metal tubes 22 and 23. As will be noted tubes 22 and 23 each have a step or shoulder region therein at 25 and 26 respectively in order to effect a register with the ends of insulator member 21. The sealing of insulator 21 to tubes 22 and 23 may be by any method known to the art. Herein tubes 22 and 23 are metal having the same thermal coefficient of expansion as glass.

Referring now to Figure 3 there is shown subassembly 30 consisting of annular insulator member 21 and tube members 31 and 32 respectively. It will be noted that register is effected between bumps 33 and 34 with the opposite ends of insulator 21. Tubes 31 and 32 are, in a manner well known to the art, sealed to insulator 21.

The difference, therefore, between the subassembly 20 of Figure 2 and subassembly 30 of Figure 3 is the substitution of bellowed or beaded tube members in place of stepped tube members and the use of thinner glass walls resulting in a larger open channel through the inside of the package while maintaining the same outside diameter.

In Figure 4 there is shown a view partly in section of a completed semiconductor diode constructed in accordance with the present invention, i. e., subassembly 30 of Figure 3 constitutes the main part of the device package. Herein beaded tubes 31 and 32 have inserted therein metal pins or electrodes 40 and 41 respectively. At the end 45 of pin 40 there is welded a resilient whisker element 44 while semiconductor crystal 42 is ohmically bonded to end 46 of pin 41. Crystal 42 in this example is shown to have a diffused region 43 of the opposite conductivity type from that of crystal 42 proper resulting in a P–N junction between it and crystal 42. Whisker element 44 is bonded to region 43 by any method known to the art, one such method being disclosed in copending U. S. patent application entitled "Method for Producing Electrical Contact to Semiconductor Devices," Serial No. 608,063, by K. A. Yamakawa, filed September 5, 1956.

Finally tubes 31 and 32 are welded to pins 40 and 41 as shown at 50 and 51 to produce a hermetic seal of the entire package. While herein a welded joint is depicted between the pins and tubes such is illustrated by way of example only. Cementing, soldering or any other method known to the art may also be used to produce this final seal.

As was previously discussed herein, semiconductor devices must be able to withstand certain mechanical shock tests, in particular one such test is the so-called drop test. In the prior art devices, such as those employing a rigid subassembly as that shown in Figure 2, the fractures produced in such devices as the result of the drop is relatively great. It has been found that a definite correlation exists between the natural or resonant frequency induced in the device upon dropping and the time of duraiton of the shock produced by such drop. In particular, experiments have shown that if the period of the resonant frequency of the device is greater than the time of duration of the shock to which such a device is subjected during a drop test, as for example dropping the device from a height of 30 inches onto a maple block, the standard JAN test, that the percentage of fractures is greatly reduced. In fact, it has been empirically determined that the number of fractures per lot has been reduced by a factor of ten.

In Figure 5 a graph showing fractures as a function of resonant frequency for diodes constructed in accordance with the present invention indicates that there is a desired range of frequencies which result in greatly diminished incidence of fracture. It has been found experimentally that a value 59 approaching the low point on the curve is probably the lowest practical value obtainable in production.

In order to control the resonant frequency of the dropped device, several factors must be considered. The wall thickness of the beaded tube, the height of the flange of the bead, the opening of the bellows of the bead and the diameter of the tube all affect the resonant frequency assuming a given mass for the entire assembly and the pins and further assuming a given material for the tubes. It has been found that, as the height of the bellows is increased and as the opening of the bellows is enlarged, that the resonant frequency decreases. Contrariwise, it has been found that the resonant frequency will increase with an increase of the diameter or wall thickness of the tubes.

With the above information one skilled in the art can design a package having a resonant frequency whose period is greater than the shock duration applied. An example of tube design parameters found to be most satisfactory by the inventors of the present invention are the following:

| | Wall thickness | Inside diameter | Height of bead | Bead opening |
|---|---|---|---|---|
| | *Inches* | *Inches* | *Inches* | *Inches* |
| A | .006 | .076 | .013 | 0–.010 |

For a body of intermediate flexibility the following:

| | Wall thickness | Inside diameter | Height of bead | Bead opening |
|---|---|---|---|---|
| | *Inches* | *Inches* | *Inches* | *Inches* |
| B | .005 | .075 | .020 | 0–.010 |

For a body of most flexibility the following:

| | Wall thickness | Inside diameter | Height of bead | Bead opening |
|---|---|---|---|---|
| | *Inches* | *Inches* | *Inches* | *Inches* |
| C | .005 | .056 | .020 | 0–.010 |

And for a body which is most rigid, the following:

| | Wall thickness | Inside diameter | Height of bead | Bead opening |
|---|---|---|---|---|
| | *Inches* | *Inches* | *Inches* | *Inches* |
| D | .007 | .076 | .007 | 0–.010 |

The above figures are all based upon a diode, the mass of whose respective parts are as follows:

| | Mg. |
|---|---|
| Whisker pin | 194 |
| Crystal pin | 162 |
| Diode crystal | 88 |
| Entire diode assembly | 444 |

It should further be noted that in accordance with the factors discussed hereinbefore, the flexibility may be varied as required. The choice of flexibility will typically be controlled by the degree of shock reduction required. If a glass envelope having thicker walls be used, then a higher degree of rigidity resulting in an increased resonant frequency may be used. All of the above parameters assumed a glass envelope whose outside diameter is .130″ and whose inside diameter is .091″.

In addition to the substantial advantages gained in the reduction of fracture propensity, many other advantages result from the use of such beaded tubes. Tubes manufactured to produce these beads or bellows are not machined but may rather be spun as illustrated and discussed in an article entitled "Design With Tubing," by W. O. Nussear, Jr., which appeared in the March 1956 issue of Machine Design Magazine. Tubes manufactured by this process have cleaner surfaces than machined tubes. Further, the internal diameter can be held to much closer tolerances as well as the wall thickness and outside diameter than is the case with the stepped machined tubes. The elimination of machining in the manufacture of these tubes eliminates burring and work hardening.

Also due to the closer tolerances which can be maintained, the fusing operation of the tubes to the glass is easier to control, this due to the fact that the impedance of the load is more constant from part to part (i. e., the subassembly 30) and therefore easier to match to an R. F. generator which may supply the heat for the glass to metal sealing operation or other well known gas heat sealing techniques, or the like.

Figure 6*a* shows how the whisker element 44 is displaced by an angle α about crystal 42 when housed in a subassembly of rigid construction such as that shown in Figure 2, this when the diode is subjected to an impact force illustrated by arrow 60.

On the other hand, the displacement angle β of the whisker element 44 shown in Figure 6*b* is considerably less than α of the Figure 6*a* configuration. In this view arrows 61 and 62 indicate forces being exerted upon the whisker and whisker pin respectively during drop testing.

In Figure 6*c* there is shown the whisker pin end of the entire diode assembly shown in Figure 4. In a somewhat exaggerated view as to the displacement of such pin upon impact during drop testing. The force upon whisker pin 40 is represented by arrow 62. It will be noted that the bellows of tube 10 are forced closed at the bottom, while the upper portion thereof is forced open relative to its normal opening of magnitude X where X is typically in the range between 0–.010″.

Thus, there has been described a new and novel semiconductor glass sealed package for large electrode semiconductor crystal devices. It should be noted, however, that the package of the present invention need not be limited to use with semiconductor crystal devices, but may be applicable to other components such as metal oxide rectifiers and the like.

What is claimed as new is:

1. In a semiconductor device, a housing assembly comprising: a hollow insulator sleeve of substantially uniform cross sectional area and having first and second ends, said sleeve further having a predetermined wall thickness; and first and second tube members composed of a material having a coefficient of thermal expansion of the same order of magnitude as that of said insulator sleeve, each of said tube members having first and second end regions separated by a bellows region, said bellows region having a diameter substantially greater than said first and second end regions, the outside diameter of said first and second end regions of said tubes being substantially the same as the inside diameter of said insulator sleeve, said first and second tube members being inserted within said sleeve so that the ends of said sleeve are in register with said bellows regions of said tubes, said tubes being fused to said sleeve to form a hermetic seal therebetween.

2. In a semiconductor device, a housing subassembly adapted to co-operate with a pair of metal pins each having a predetermined mass to provide a hermetically sealed cavity for encapsulating a semiconductor crystal, said housing subassembly comprising: a hollow tubular glass sleeve of substantially uniform cross sectional area having first and second ends, said sleeve further having a predetermined wall thickness; and first and second tube members composed of a material having a coefficient of thermal expansion of the same order of magnitude as that of said sleeve, each of said tube members having first and second end regions separated by a bellows region, the bellows regions of said tube members being in register with and hermetically sealed to the ends of said glass sleeve.

3. The device of claim 2 wherein the wall thickness of said tube members is in the range from 4.5 to 8 mils, the length of said tube is in the range from 100 to 250 mils, the height of the bellows regions is in the range from 10 to 18 mils and the opening of said bellows regions is in the range from 0 to 7 mils and wherein the mass of said pins is in the range from 150 to 200 mg.

4. A semiconductor crystal diode comprising: a semiconductor crystal; a whisker element having one end in contact with a first surface of said crystal; an envelope subassembly comprising an annular glass sleeve and metallic tubes having a central bellows region, said sleeve being sealed to said tubes; and metal pins of a predetermined mass hermetically sealed through said tubes and separately supporting said crystal and said whisker element in mutual contact.

5. A semiconductor crystal diode of the type having large metal pins as electrodes hermetically sealed within an envelope subassembly wherein said subassembly consists of an annular glass sleeve having beaded metal tubes sealed within opposite ends thereof, said diode package comprising: beaded metal tubes having a wall thickness, height of bead and bead opening thereof so constructed as to provide a natural frequency whose period is greater than the duration of the shock to which such a diode is subjected upon being dropped from a height of 30 inches onto a maple block.

6. A semiconductor crystal device comprising: a semiconductor crystal of a predetermined conductivity type, said crystal having in one surface thereof a region of the opposite conductivity type from that of said crystal; a whisker element having one end bonded to said region of said crystal; an envelope subassembly comprising an annular glass sleeve and metallic tubes, said tubes having first and second end regions separated by a central bellows region, said sleeve being sealed to said tubes; and metal pins of a predetermined mass being inserted within and sealed to said tubes to effect a hermetic seal therebetween, said pins separately supporting said crystal and said whisker element.

7. A semiconductor crystal rectifier comprising: a silicon semiconductor crystal of a predetermined conductivity type, said crystal having a diffused region of the opposite conductivity type in a first surface thereof; a resilient whisker element having one end bonded to said region of said crystal; an envelope subassembly comprising: an annular glass sleeve and metallic tubes, said tubes having first and second end regions separated by a central bellows region, said sleeve being sealed to said tubes; and metal pins of a predetermined mass being inserted within and sealed to said tubes to effect a hermetic seal therebetween, said pins separately supporting said crystal and said whisker element.

8. A semiconductor crystal rectifier of a total mass in the range from 440 to 450 mg. comprising: a rigid packaged semiconductor crystal rectifier comprising: a silicon semiconductor crystal of a predetermined conductivity type, said crystal having a diffused region of the opposite conductivity type in a first surface thereof; a resilient whisker element having one end bonded to said region of said crystal; a rigid envelope subassembly comprising: an annular glass sleeve and metallic tubes, said tubes having a first and second end region, separated by a central bellows region, the wall thickness of said tube being .007″, the inside diameter of said tube being .076″, the height of said bellows region being .007″ and the opening of said bellows region being in the range from 0–.010″, said sleeve being sealed to said tubes; a first metal pin being bonded to said whisker element at the other end thereof, said whisker pin having a mass of 194 mg. and a second metal pin being ohmically bonded to a second surface of said crystal, said second surface being opposite said first surface, said metal pins being inserted within and sealed to said tubes to effect a hermetic seal therebetween.

9. A semiconductor crystal rectifier of a total mass in the range from 440 to 450 mg. comprising: a flexible packaged semiconductor crystal rectifier comprising: a silicon semiconductor crystal of a predetermined conductivity type, said crystal having a diffused region of the opposite conductivity type in a first surface thereof; a resilient whisker element having one end bonded to said region of said crystal; a flexible envelope subassembly comprising an annular glass sleeve and metallic tubes, said tubes having a first and second end region, separated by a central bellows region, the wall thickness of said tube being .005″, the inside diameter of said tube being .056″, the height of said bellows region being .020″ and the opening of said bellows region being in the range from 0–.010″, said sleeve being sealed to said tubes; a first metal pin being bonded to said whisker element at the other end thereof, said whisker pin having a mass of 194 mg. and a second metal pin being ohmically bonded to a second surface of said crystal, said second surface being opposite said first surface, said metal pins being inserted within and sealed to said tubes to effect a hermetic seal therebetween.

References Cited in the file of this patent

UNITED STATES PATENTS 2,642,486 Ryan ________________ June 16, 1953
2,723,370 Bradshaw et al. __________ Nov. 8, 1955